(12) United States Patent
Simpson Alvarez

(10) Patent No.: US 10,480,088 B2
(45) Date of Patent: Nov. 19, 2019

(54) ELECTROLYTIC SYSTEM FOR PRECIPITATING METALS AND REGENERATING THE OXIDISING AGENTS USED IN THE LEACHING OF METALS, SCRAP METAL, METAL SULPHURS, SULPHIDE MINERALS, RAW MATERIALS CONTAINING METALS FROM SOLUTIONS FROM LEACHING, INCLUDING A PROCESS FOR COMBINING THE PRECIPITATION AND THE OXIDATION IN A SINGLE STEP, ELIMINATING THE STEPS OF FILTRATION, WASHING, TRANSPORTATION AND MANIPULATION OF HIGHLY TOXIC REAGENTS

(71) Applicant: PROTECH SPA, Santiago (CL)

(72) Inventor: Jaime Roberto Simpson Alvarez, Santiago (CL)

(73) Assignee: PROTECH SPA, Santiago (CL)

( * ) Notice: Subject to any disclaimer, the term of this patent is extended or adjusted under 35 U.S.C. 154(b) by 108 days.

(21) Appl. No.: 15/548,918

(22) PCT Filed: Feb. 4, 2016

(86) PCT No.: PCT/CL2016/050005
§ 371 (c)(1),
(2) Date: Aug. 4, 2017

(87) PCT Pub. No.: WO2016/123726
PCT Pub. Date: Aug. 11, 2016

(65) Prior Publication Data
US 2018/0016684 A1   Jan. 18, 2018

(30) Foreign Application Priority Data

Feb. 4, 2015   (CL) .................................. 274-2015

(51) Int. Cl.
*C25C 1/12*   (2006.01)
*C25C 7/06*   (2006.01)
(Continued)

(52) U.S. Cl.
CPC ................ *C25C 1/12* (2013.01); *C22B 3/04* (2013.01); *C22B 3/42* (2013.01); *C22B 15/0065* (2013.01);
(Continued)

(58) Field of Classification Search
CPC ....................................................... C25C 1/12
(Continued)

(56) References Cited

U.S. PATENT DOCUMENTS 4,159,232 A    6/1979  Bacon et al.
6,309,531 B1 * 10/2001 Murray ................. C22B 7/006
                                                205/580
2012/0325675 A1  12/2012 Kim et al.

FOREIGN PATENT DOCUMENTS

CA    2136052 A1    5/1995
GB    2368349 A     5/2002
(Continued)

OTHER PUBLICATIONS

The International Search Report dated May 20, 2016; PCT/CL2016/050005.

*Primary Examiner* — Harry D Wilkins, III

(57) ABSTRACT

The invention relates to a combined electrolytic system for precipitating different types of metals (copper, zinc, nickel, cadmium, cobalt, silver, gold) and regenerating reagents for the leaching of metal sulphurs from solutions from leaching in a sulphuric-oxidising or hydrochloric-oxidising environment, including a process that permits the combining of the current reduction processes followed by oxidising processes which are complex and potentially dangerous from an (Continued)

environmental point of view, thereby preventing the risky transportation of dangerous substances, loading and unloading operations, storage and manipulation of toxic materials, and reducing the environmentally contaminating waste, producing a commercial-quality cathodic product and a solution that is re-used in the leaching process. The system comprises a membrane cell device (3) that is connected via ducts and valves to one or more oxidising agent tanks (7), to one or more anodic solution tanks (6) and to one or more cathodic solution tanks (2), wherein said membrane device (3) is formed by one or more cathodic compartments (4) and by one or more anode compartments (5), wherein each of the cathodic compartment(s) (4) is/are separated from each of the anode compartment(s) (5) by a membrane for selective and uni-directional ion exchange.

6 Claims, 3 Drawing Sheets

(51) Int. Cl.
| | | |
|---|---|---|
| *C22B 3/04* | (2006.01) | |
| *C25C 1/08* | (2006.01) | |
| *C25C 1/16* | (2006.01) | |
| *C25C 1/20* | (2006.01) | |
| *C25C 7/00* | (2006.01) | |
| *C25C 7/04* | (2006.01) | |
| *C22B 3/42* | (2006.01) | |
| *C25B 1/26* | (2006.01) | |
| *C25B 9/08* | (2006.01) | |
| *C22B 15/00* | (2006.01) | |
| *C25B 1/30* | (2006.01) | |
| C25D 17/00 | (2006.01) | |
| C25D 17/02 | (2006.01) | |

(52) U.S. Cl.
CPC .................. *C25B 1/26* (2013.01); *C25B 1/30* (2013.01); *C25B 9/08* (2013.01); *C25C 1/08* (2013.01); *C25C 1/16* (2013.01); *C25C 1/20* (2013.01); *C25C 7/00* (2013.01); *C25C 7/04* (2013.01); *C25C 7/06* (2013.01); *C25D 17/002* (2013.01); *C25D 17/02* (2013.01); *Y02P 10/234* (2015.11); *Y02P 10/236* (2015.11)

(58) Field of Classification Search
USPC .................................................. 205/580, 582
See application file for complete search history.

(56) References Cited

FOREIGN PATENT DOCUMENTS

| MX | 2013008030 A | 1/2015 |
| WO | 2004/022796 A1 | 3/2004 |

* cited by examiner

ELECTROLYTIC SYSTEM FOR PRECIPITATING METALS AND REGENERATING THE OXIDISING AGENTS USED IN THE LEACHING OF METALS, SCRAP METAL, METAL SULPHURS, SULPHIDE MINERALS, RAW MATERIALS CONTAINING METALS FROM SOLUTIONS FROM LEACHING, INCLUDING A PROCESS FOR COMBINING THE PRECIPITATION AND THE OXIDATION IN A SINGLE STEP, ELIMINATING THE STEPS OF FILTRATION, WASHING, TRANSPORTATION AND MANIPULATION OF HIGHLY TOXIC REAGENTS

The invention reveals a combined electrolytic system for precipitating different types of metals (copper, zinc, nickel, cadmium, cobalt, silver, gold) and regenerating reagents for the leaching of metal sulphurs from solutions from leaching in a sulphuric-oxidising or hydrochloric-oxidising environment, including a process that permits the combining of the current reduction processes followed by oxidising processes which are complex and potentially dangerous from an environmental point of view, thereby preventing the risky transportation of dangerous substances, loading and unloading operations, storage and manipulation of toxic materials, and reducing the environmentally contaminating waste, producing a commercial-quality cathodic product and a solution that is re-used in the leaching process.

The system comprises an electrolytic device based on membrane technology composed of an electro-oxidation for regenerating the required leaching reagents and an electro-reduction to precipitate the desired metal or metals. This process replaces the current processes of treatment of rich solutions from leaching of metals, scrap metal, metal sulphurs, sulphide minerals, raw materials containing metals, such as conventional electrowinning, cementation and oxidation of strongly oxidising reagents such as gaseous chlorine or hydrogen peroxide among others.

The system of the invention is incorporated into existing installations but which have to be especially intervened, modified and conditioned. This system is complemented with tanks, piping, valves, drive systems, instrumentation and control, and a transformer-rectifier that supplies the necessary electrical energy.

The system and its combined electrolytic process can be applied to solutions rich in the metal of interest leached in different environments such as oxidising acids or oxidising alkali, either in complexing systems or not. This system comprises an electrolytic device which consists of a selective and unidirectional membrane cell, to carry out the electrowinning of the metal of interest, wherein it is to be understood that metal of interest is the metal that is desired to be produced and which precipitates on the surface of the cathode. Simultaneously, the electro-oxidation of the leaching agent which permits the regeneration of the leaching reagent occurs on the anodic surface.

Problem of the Previous Art

The problem of the present art is synthesized in that all the technological alternatives conceive the precipitation of the metal of interest, or which is desired to be produced, and the regeneration of oxidising agents as two technologies which are sequential and independent of each other.

The existing precipitation systems and processes can be chemical or electrochemical processes. The chemical precipitation processes are made of proper precipitation stages such as thickening and filtration, with their respective washing steps and consequent liquid or solid effluents. Processes of electrochemical nature can be of spontaneous type, such as cementation, or forced type such as the electrowinning of metals. Spontaneous metal precipitation processes also require thickening and filtration steps, with washing steps and consequently they produce liquid and solid effluents which have to be disposed of.

Forced electrowinning processes require cathode washing steps, the solutions thereof re-introduced into the process. However, because the electrolytic decomposition of water is used, they produce acid mist and solid waste by anodic corrosion.

In particular, it is very convenient when the conventional electrowinning is applied in a production process applied to oxidised copper minerals in which the leaching agent is sulphuric acid since, precisely, this reagent is regenerated with the electrolytic decomposition of the water on the anode. However, for the leaching of copper sulphurs the leaching agent is not sulphuric acid but, due to thermodynamic condition, an oxidising agent, which in the case of copper the ferric ion has been the one mostly used.

It is for this reason that necessarily after the precipitation of the metal of interest, an oxidative process is required to regenerate the leaching reagent to dissolve the metals contained in metal sulphurs, metal or metal scrap or any compound requiring the presence of oxidising agents in leaching. Oxidative processes require the use of very strong oxidising agents, which are toxic, dangerous and difficult to handle in the operation. These processes can generate highly polluting leakages or spills that must be neutralized, leaving environmental damage, with the risks associated with environmental safety.

The combined electrolytic system herein disclosed includes a process that combines the precipitation of metals with the regeneration of the leaching reagent using electrical energy (specifically, direct current) to electro-deposit the metal in the form of a cathode and electro regenerate the leaching agents, by means of an anodic reaction produced on a conductive or semi-conducting electrode. This process eliminates much of the waste, generates a product of easy commercialization, diminishes the transport of dangerous reagents, eliminates the use of scrap and reduces the consumption of oxidation reagents.

The system and process disclosed allows to treat rich solutions with contents of metals of interest in solution, from leaching processes of metals, sulphur ores or concentrates of metal sulphurs, by means of an electrolytic device based on membrane technology, in which the metal of interest is precipitated on the cathode and the leaching agent is electro-regenerated on the anode and remains contained in the anode compartment solution. The amount of reagent that is electro-regenerated on the anode is proportional to the precipitated metal, requiring minimal amounts of reagent to adjust the amount of reagent required for the dissolution process of the metal. The metal precipitated in the form of a cathode is suitably washed and made available for final commercialization. The regenerated leaching agent is hydraulically conveyed to the leaching process.

The system disclosed allows the electrowinning of metals in the form of commercial quality cathodes and the electrolytic regeneration of the oxidising agent, which is the leaching reagent required in leaching processes in chlorinated environments or in sulphur environments, using a membrane electrolytic cell Selective and unidirectional ion exchange, including its accessories and materials (electrodes, conductors, pumps, piping, fittings, valves and instrumentation). This system simultaneously allows to reduce environmental risks derived from the transportation, use and manipulation of toxic substances.

State of the Art and Context

At present there is no system and process that performs in a single stage the precipitation of metals and at the same time regenerate the oxidising agent used in the leaching process of metal sulphurs or metals. This has hampered the development of hydrometallurgy applied to metals and sulphur concentrates. In fact, today's existing technologies are complex to apply to treat rich solutions from leaching.

For example, in order to treat the rich solutions from leaching after the respective filtration step in the de-copperising of molybdenum concentrates, an iron scrap cementation step, a new filtration step which generates an aqueous effluent through a washing step and purge to control impurities in the production system are considered. Then the copper-free solution is oxidized with gaseous chlorine, the leaching reagent is added to maintain concentration and is sent to leaching, closing the circuit. The oxidation process with chlorine can also be run with oxygenated water, ozone, hypochlorite or any reagent that is able to oxidize (and thus regenerate) the leaching reagent. Chlorine gas is generally used to regenerate the reagent.

The conventional electrowinning process can replace the cementation process, but the high content of impurities, especially iron, increases energy consumption too much, decreases the faradic current efficiency and also generates acid mist, which if the process is performed in hydrochloric environment it can be very serious due to the evolution of gaseous chlorine. The use of solvent extraction prior to conventional electrowinning could be considered, however when impure solutions are available with high concentrations of copper in solution, it is not possible to apply a solvent extraction process to purify and concentrate, since the physical properties of the extractants are lost and would forcefully require a large amount of extractants in stock.

As an example, in the case of Chile production of molybdenite concentrates (Moly, $MoS_2$) represents just over 16% of world production, ranking 3rd after China and the USA (information up to 2009), respectively. Moly's Chilean reserves account for almost 13% of world reserves and analysts predict a sustained increase in Moly demand, making it possible for Chilean companies to increase future production. The requirement on the quality of molybdenite concentrates (Moly) imposes a minimum content of copper, labeled as impurity in this case, which requires a complex and chemically demanding hydrometallurgical process to remove it from the Moly concentrates in order to comply with market conditions (grades lower than 1% Cu).

This is how Minera Los Pelambres, CODELCO's Andina Division and Xstrata in Altonorte (Antofagasta) have a leaching process with ferric chloride to remove the copper contained as copper sulphur (BRENDA process), and in the medium-term CODELCO Norte is planning a process of this type to control the copper contained in its Moly concentrates.

The Brenda process allows the de-copperisation of the molybdenite concentrate, in which the dissolution of molybdenum is less than 0.05%, indicating that it is a highly selective process. Removal of impurities from the concentrate is carried out by leaching the copper with a solution acidified with hydrochloric acid and containing ferric chloride, cupric chloride and, in some cases, calcium chloride, at temperatures in the range of 110° C. to 140° C. The pulp resulting from the leaching is cooled and the concentrate is separated from the solution by successive stages of filtration and washing. The solution with solubilized copper, obtained from leaching, is cemented with iron scrap, producing copper precipitate as a by-product of the process. Then the solution produced from the cementation, which contains mainly ferrous chloride, is regenerated with pressurized gaseous chlorine to be reused in the leaching.

Currently, the Brenda process is applied, which uses ferric chloride, cementation and chlorine gas. There is no company specifically dedicated to this, rather there are different suppliers of equipment that carry out the engineering required for this solution.

If reviewed by sub-process, it should be mentioned that copper cementation is a process already abandoned by small and medium-sized mining, mainly because copper cement is difficult to commercialize and because of the purged material generated by the excess iron.

This technology was replaced by solvent extraction processes followed by electrowinning.

Copper solvent extraction, so successful in extractive copper metallurgy from oxidized copper minerals, can not be applied in the de-copperisation of molybdenite concentrates, because the high concentrations of copper in solution, acidity and oxidising environment are harmful to organic extractants which degrade. Additionally, the extractants have a low load capacity that would force to use high concentrations of extractants, which consequently increases the drags making its application technically and economically inviable. Therefore solvent extraction can not be applied.

If the conventional copper electrowinning process were applied directly, the current efficiency would decrease to values that would diminish the system's economical feasibility due to the oxidizing at the anode and reduction at the cathode of the Fe (II)/Fe (III) couple, resulting in a high energy consumption, by this parasitic reaction. Conventional systems use the electrolytic decomposition reaction of the water, which generates acid mist and due to the high chloride concentrations inevitably generates the dangerous chlorine gas, generating losses of this reagent and resulting in a highly polluting process.

Therefore, the existing technology on the market is not applicable as an alternative solution to replace cementation. Unable to eliminate cementation, the process will continue to generate a contaminating effluent to control the levels of iron.

The U.S. Pat. No. 3,674,424 relates to the removal of impurities from molybdenite concentrates by leaching of concentrates at temperatures above 70° C. The U.S. Pat. No. 3,714,325 relates to the leaching of low grade molybdenite flotation products by means of water and at high temperature and pressure. The U.S. Pat. No. 3,694,417 relates to a process for the extraction of impurities from a molybdenum oxide concentrate with leaching of the concentrate with ammonium halide solution and a hydrohalic acid.

Advanced oxidation can be mentioned in the case of a search for oxidising agents or alternative oxidising systems for the regeneration of ferric chloride from ferrous chloride. However, it has not reached the technological development necessary to become as a substitute for gaseous chlorine. Even if advanced oxidation can be applied, there is a risk of chlorine being lost in the process by the emission of gaseous chlorine due to the high oxidising conditions reached.

There are other processes in leaching that are carried out in a sulphate medium at high temperature, based on conventional electrowinning, but are very expensive and less efficient than the Brenda process.

There are no systems and processes similar to the one proposed. There are engineering companies involved in the design of molybdenite concentrate de-copperisation plants, but they are based on the current model, i.e. leaching with ferric chloride, copper cementation and oxidation of ferrous chloride to ferric chloride using chlorine gas.

Accordingly, there is currently no competitive technology to the one proposed as the combined electrolytic system and process of the invention.

There are no developments similar to the system and process proposed. However, in the sub-process of copper precipitation the EMEW@ cell (Blumos Company) could be mentioned which is an electrowinning cell having a design which allows to control the acid mist and operate at higher flow rates than the conventional cells. However, the anodic and cathodic reactions are the same as those used by conventional processes and consequently with the same problems. The following are the reactions used by the conventional processes and by the EMEW cell:

Main Anodic Reaction:

$$H_2O = 2H^+ + \tfrac{1}{2}O_2 + 2\bar{e} \tag{3.5}$$

Secondary or Parasitic Reactions $$Fe^{2+} = Fe^{3+} + \bar{e} \tag{3.6}$$

$$2Cl^- = Cl_2 + 2\bar{e} \tag{3.7}$$

Main Cathodic Reaction:

$$Cu^{2+} + 2\bar{e} = Cu \tag{3.8}$$

Secondary or Parasitic Reactions $$Fe^{3+} + \bar{e} = Fe^{2+} \tag{3.9}$$

$$H_2 = 2H^+ + \bar{e} \tag{3.10}$$

Note that the anodic reaction 3.5 requires an energy threshold such that gaseous chlorine evolves (reaction 3.7), which involves the loss of the chlorine reagent, implies contamination and implies unnecessary consumption of energy. The reaction 3.6 shows the oxidation of ferrous ion to ferric ion (in a chloride environment), which seems to be good for the regeneration of the ferric chloride reagent, however the reaction 3.9 indicates that the ferric ion generated is reduced to ferrous ion at the cathode. This oxidation-reduction of Fe (III) to Fe (II) consumes energy and does not allow the regeneration of the reagent.

Therefore, existing Fe (II) to Fe (III) copper and oxidation precipitation technologies differ from the system and process of the invention.

In the case of the Moly concentrate, the copper-rich solution is fed in a cementation process with iron scrap, producing as product a copper cement with a grade of more than 80% copper. The cementation process is based on the following electrochemical reaction:

$$Cu^{2+} + Fe = Cu + Fe^{2+} \tag{3.1}$$

According to the electrochemical reaction (3.1), for each mol of copper deposited as copper metal, 1 mol of iron is consumed, which is solubilized as $Fe^{2+}$, that is, whenever copper cementation occurs, the amount of iron into the solution increases. Since the system operates in closed circuit, this implies that the iron concentration continuously increases. In order to prevent the concentration of iron from reaching critical values that hinder the process, a fraction of the volume of the solution must be purged, discarding solutions containing high $Fe^{2+}$, HCl, $Cl^-$, $Cu^{2-}$ and other metals in solution.

As a result of the leaching process, cementation and purges, a solution is produced containing high concentrations of $Fe^{2+}$, HCl, $Cl^-$, $Cu^{2+}$ and other metals in solution. However, to achieve the dissolution of copper sulphures, the process requires $Fe^{3+}$ as a reagent, so it is necessary to oxidize $Fe^{2+}$ to $Fe^3$ to close the circuit. For this, it is used in the pressurized chlorine gas ($Cl_2$) injection process, in which the following electrochemical reactions (9) take place:

Anodic Reaction:

$$Fe^{2+} = Fe^{3+} + \bar{e} \tag{3.2}$$

Cathodic Reaction:

$$Cl_2 + 2\bar{e} = 2Cl^- \tag{3.3}$$

Global Reaction:

$$Cl_2 + 2Fe^{2+} = 2Fe^{3+} + 2Cl^- \; \Delta G°_{100°\,C.} = -18.4 \text{ kcal} - K = 5.7 \times 10^{10} \tag{3.4}$$

An adjustment of the $Fe^{3+}$ concentration should be considered.

In this existing process, the following problems can be highlighted:

A highly polluting purged material containing ferrous ion is generated, which theoretically is a large part of the iron that is introduced into the solution by the cementation. It also contains heavy metals, hydrochloric acid and free chlorine.

The copper cement produced contains chlorine as an impurity and the market for this product is increasingly limited and sales prices are not attractive. In practice, it builds up in warehouses of the plant.

Iron scrap—a raw material for cementation—is scarce and expensive. It involves encapsulated and clean scrap, a highly polluting and expensive previous process. It is visualized that in the future the scrap will be even more scarce and the prices, consequently, higher.

The existing process and which is used nowadays requires gaseous chlorine, an extremely toxic gas. While no major emergencies have occurred, no one can assure that they will not occur in the future.

Occidental Chemical Chile Ltda. is the only company in Chile that produces caustic soda, liquid chlorine, calcium chloride, ferric chloride, sodium hypochlorite and hydrochloric acid and it is located in Talcahuano, VIII Region. When the earthquake occurred in 2010, the plants using these reagents were not supplied due to the sequels caused by the earthquake.

There is always a greater risk during transport of these dangerous substances by road, especially because great distances are travelled to deliver the reagent to the plants that require it. The toxic characteristics of this reagent limit its importation from abroad.

Although the oxidative process of ferric ion to ferric ion is effective, since the conversion achieved is close to 100%, it is inefficient since it require a significant excess of chlorine in the system, which results in a growing increase of chlorine in the solutions. Purging is also performed to control excess chlorine.

In order to solve many of the problems listed above, a new process of oxidation of ferrous ion into ferric ion in a hydrochloric environment must be considered that replaces oxidation with chlorine gas, that does not generate excess chlorine in the solutions, that allows the recovery of copper in a product of better quality, that is commercialized in the market without major problems and that minimizes purged material to values close to zero.

The opportunity for technological change allows the reduction of environmental risks derived from the transportation, use and handling of toxic substances such as chlorine gas, both in the plant itself and transport of the reagent from its point of production to the plant for the de-copperisation of concentrates of Moly.

The opportunity to change this technology is reflected in a decrease in the residual effluents of the plant which applies it, eliminating risks, reducing the costs associated with its waste and will acquire a better image in front of the surrounding communities.

The opportunity lies in producing copper cathodes of chemical and surface quality that permits direct commercialization with the market.

The opportunity perhaps more difficult to visualize lies in the fact of regenerating, through a clean technology, much of the ferric chloride required by the process, reducing the requirements of this reagent to adjust the concentrations of the solutions.

Eliminating the cementing process would allow the elimination of the consumption of iron in the form of scrap, leaving scrap available for re-melting or export as a raw material. Today that scrap is thrown as ferrous ion in a hydrochloric environment, as a residual effluent with no commercial value whatsoever.

DETAILED DESCRIPTION OF THE INVENTION

Figure 1:
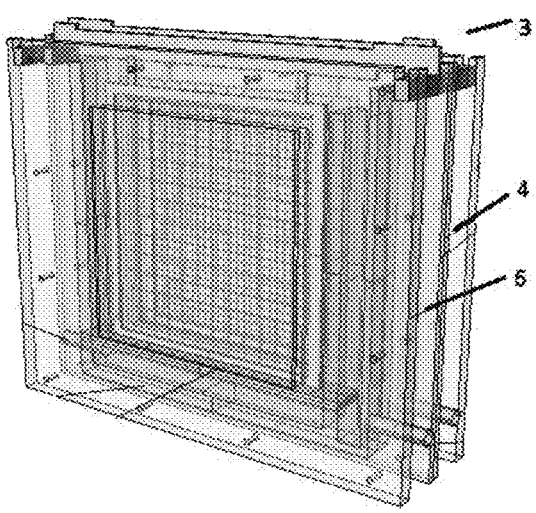
FIG. 1 shows in isometric view the base unit of a membrane cell device (3).

The combined electrolytic system of the invention consists basically of the incorporation of a membrane cell device and the sequential incorporation of at least three fluid inflow and outflow tanks of fluids, piping, valves, ducts, drive mechanism, instrumentation and control, and a transformer/rectifier that supplies the necessary electrical energy, wherein this system as a whole is incorporated into an existing leaching system and process.

The membrane cell device is comprised of alternating compartments containing electrolytes called anolyte and catholyte, said electrolytes sharing a contiguous wall which is a selective and unidirectional ion exchange membrane, wherein said membrane is of anionic or cationic type, as the case may be. In each compartment of the device an electrode is immersed so that the ones immersed in the anolyte are electrically connected to the positive pole and those in the catholyte are connected to the negative pole.

For example, in the case of copper, when applying a potential difference between the two electrodes, the copper ion is reduced to metal copper on the cathode and the oxidation reaction of $Fe^{2+}$ to $Fe^{3+}$ occurs on the surface of the anode. The circuit requires the transport of electric charges from the catholyte to the anolyte through the ions contained in the catholyte, said ions corresponding to the chloride ion when it is in a hydrochloric environment, wherein said ion is transferred from the catholyte by to the core of the anolyte crossing the ion exchange membrane, that is, the membrane allows to maintain the electrical conductivity of the system. The catholyte is the source of copper in solution that allows the production of cathodic copper, while the anolyte is the source of generation of ferric ion to be reused in the leaching process.

The system does not require filtration and does not require oxidation with chlorine gas, ozone, hydrogen peroxide or hypochlorite or any other oxidising reagent. In this example, the use of the above-mentioned membrane cell device differs completely from the processes currently used, since said membrane cell is the one which allows replacing the current treatment of copper-rich solutions by precipitation via cementation with iron scrap, which includes filtration and washing, which generates aqueous effluents both with the washing water of the produced cement as by a forced purging of solutions rich in hydrochloric acid, ferrous chloride and cupric chloride among other impurities.

The processes for the treatment of rich metal leaching solutions or metal sulphures which are currently applied consider a reduction step to recover the metal of interest and an oxidation step, both steps being independent and sequential processes. Reduction processes sometimes require a prior purification and concentration step, as in current electrowinning processes. The oxidation step receives the solution coming out of the reduction process and this step is designed to regenerate the leaching agent by means of the introduction of oxidising gases (chlorine, ozone, ozone-oxygen mixtures) by means of strongly oxidising agents (hypochlorite, hydrogen peroxide, among others) or mixtures between gases and oxidising reagents.

Instead, the system of the invention is a technology that allows a radical differentiation since it is a membrane cell device which is capable of electrolytically precipitating the metal of interest, which is desired to be produced, as a cathode, without requiring a prior purification or concentration process and simultaneously generate at the anode the oxidising agent for reuse in the leaching process, that is, it replaces the purification/concentration/precipitation processes of the metal of interest (either from cementation/ filtration, chemical precipitation/sedimentation/filtration or solvent extraction/electrowinning processes), eliminating at the same time much of the effluents currently generated.

FIG. 1 shows in isometric view the base unit of a membrane cell device (3) (as in Chilean Patent Application No. 2014-03049), wherein a cathode compartment (4) and an anode compartment (5) separated by a selective and unidirectional ion exchange membrane can be observed, this electrolytic device intended for forced or non-forced electrolytic processes and using two independent electrolytes conveniently selected from the energy point of view and which allow the electrolytic precipitation of the metal of interest in a controlled manner with high efficiency of faradic current and with a high energy performance. This membrane cell device (3) may be used in groups to form a grouped together array of base units, as numerous as required. That is, it may be formed by one more cathode compartments (4) and one or more anode compartments (5), each separated from each other by a selective and unidirectional ion exchange membrane.

Figure 2:
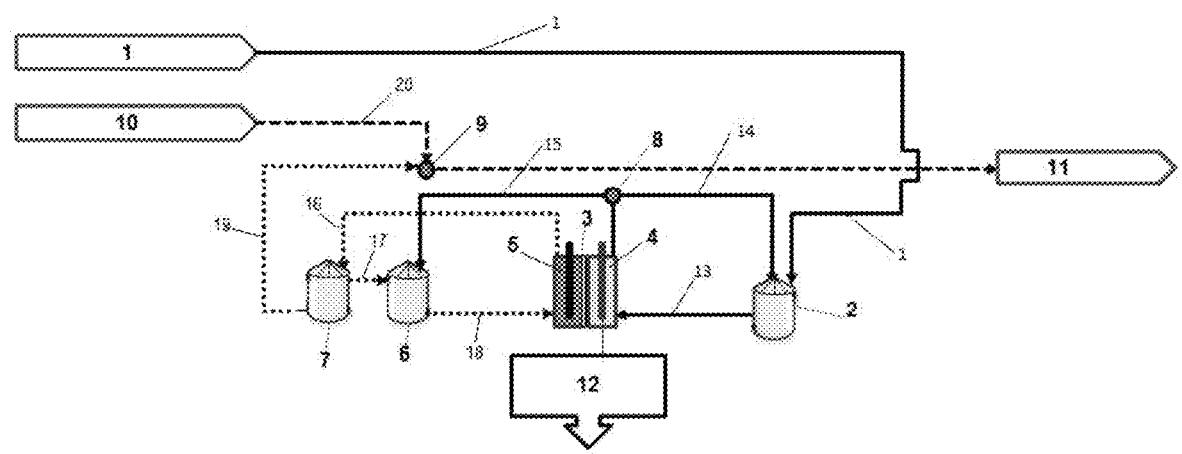
FIG. 2 shows a diagram of the combined electrolytic system.

FIG. 2 shows a diagram of the combined electrolytic system wherein the rich solution from leaching (1) is conveyed by flow ducts to a cathodic feed tank (2) which supplies solution to the cathode compartments (4) of a membrane cell device (3). The solution entering the cathode compartment (4) is conducted by a flow (13) and a distribution valve (8) distributes part of the solution exiting the cathode compartment (4) to a anodic feed tank (6) of anode compartments (5) of said membrane cell (3) via the flow line (15) and another part of the solution coming out of the cathodic compartment (4) is conveyed via flow (14), as recirculating solution back to the cathodic feed tank (2). From the anode feed tank (6), solution enters via flow (18) the anode compartment (5) of the device (3) and the solution of said anode compartment (5) is fed via flow (16) to a product solution tank of oxidising agents (7), wherein part of this solution contained in said tank (7) is returned via flow (17) to the anodic feed tank (6) and another part thereof is conveyed via flow (19) to a conveying valve (9) where the oxidising agent replenishment (10) converges via flow (20) and both flows (19) and (20) are conveyed to the oxidising agent (11). Closing the circuit of the system the product or cathode metal (12) is produced.

By flow duct or flow line or flow, it must be understood as channelling and closed conveyance means of solutions within the system. It should be appreciated that the system comprises channelling means, drive means, energizing means, measuring means and automation and control means.

By rich solution it must be understood as a solution with a high content of the metal that it is desired to be produced.

Figure 3:
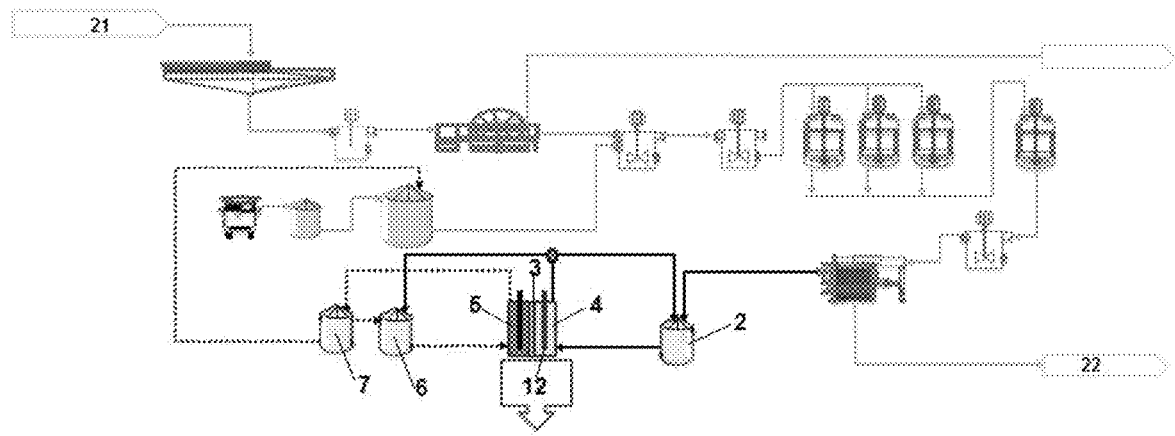
FIG. 3 shows as an example a diagram for the case of concentrate of de-copperisation of molybdenite concentrates.

FIG. 3 shows as an example a diagram for the case of concentrate of de-copperisation with FeCl3 of molybdenite concentrates (21), in which said concentrate is fed to a thickener and to a filtration system that allows to regulate the % of solids of the pulp which feeds the pulp storage and conditioning tanks with the rich ferric chloride solution, which is the leaching agent of the process. The conditioned pulp feeds the leaching tanks in which the dissolution of the copper sulphides is promoted. As a result of the leaching process, a concentrate of Moly (22) with low copper contents is produced, thus meeting the quality requirement of the concentrate, and a solution rich in copper in solution is produced with high ferrous ion contents, both in chlorinated environment. Both components are separated in a plate filter in two stages: in the first one the solution rich in $Cu^{2+}/Fe^{2+}$ is produced and a solid which enters a second stage corresponding to a washing of the solid corresponding to the commercial Moly concentrate. The wash solution of this second stage is a disposable residue and the Moly concentrate is packed for final shipping. The flow of rich solution is fed into a cathodic feed tank (2) resistant to corrosion produced by aggressive chemical means. This tank further receives a recirculation flow from discharge of the membrane cells (3), specifically from the cathode compartments (4). The discharge of this tank constitutes the flow of copper-rich solution which is introduced in parallel into each cathode compartment of the cells (3). A fraction of the discharge flow from the cathode compartments of the electrolytic cells is sent to the anolyte storage tank (6), which corresponds to a polymer tank resistant to chemically aggressive environments. This tank also receives a recirculation flow from the anode compartments (5) and which correspond to a fraction of the discharge flow of said anode compartments. The other flow fraction from the said discharging is conveyed to the product tank (7), which stores the copper leaching solution present in the molybdenite concentrate, thereby closing the process circuit and producing the cathodic metal (12).

To understand the chemistry of the combined electrolytic process of the invention, it may be mentioned that the following chemical equilibrium may exist after the leaching and filtration process:

Copper Species:

$$Cu^{2+}+Cl^-=CuCl^+ \quad (4.1)$$

$$CuCl^++Cl^-=CuCl_2 \quad (4.2)$$

$$Cu^++Cl^-=CuCl \quad (4.3)$$

$$Cu^{2+}+2Cl^-=CuCl_2 \quad (4.4)$$

Iron Species:

$$Fe^{2+}+Cl^-=FeCl^+ \quad (4.5)$$

$$Fe^{2+}+2Cl^-=FeCl_2 \quad (4.6)$$

$$FeCl^++Cl^-=FeCl_2 \quad (4.7)$$

$$Fe^{3+}+Cl^-=FeCl^{+2} \quad (4.8)$$

$$Fe^{3+}+2Cl^-=FeCl_2^+ \quad (4.9)$$

$$Fe^{3+}+3Cl^-=FeCl_3 \quad (4.10)$$

Other species may be present. The performing of a speciation will be planned to model the distribution thermodynamics of species in equilibrium.

The reactions that can occur on the cathode surface are the following:

$$Cu^{2+}+2\overline{e}=Cu \quad (4.11)$$

$$Cu^{2+}+\overline{e}=Cu^+ \quad (4.12)$$

$$Cu^++\overline{e}=Cu \quad (4.13)$$

$$Cu^{2+}+2\overline{e}=Cu \quad (4.14)$$

$$CuCl^++\overline{e}=Cu \quad (4.15)$$

$$Fe^{3+}+\overline{e}=Fe^{2+} \quad (4.16)$$

$$FeCl_2^++\overline{e}=FeCl^++Cl^- \quad (4.17)$$

$$FeCl^{2+}+\overline{e}=FeCl^+ \quad (4.18)$$

Reactions (4.12), (4.16), (4.17) and (4.18) are reactions that consume electrical energy, reducing current efficiency. However, given the leaching conditions it is unlikely to find ferric ion, therefore reactions (4.16) to (4.18) are not important in terms of electricity consumption.

On the anodic surface, the following oxidation reactions may occur in the direction of oxidation:

$$Fe^{3+}+\overline{e}=Fe^{2+} \quad (4.19)$$

$$FeCl_2^++\overline{e}=FeCl^++Cl^- \quad (4.20)$$

$$FeCl^{2+}+\overline{e}=FeCl^+ \quad (4.21)$$

The reaction on the electrode surfaces and the ion transfer through the anionic exchange membrane is schematically explained in FIG. 9. In the figure the occurrence of the reaction (4.11) and the reaction (4.19) are taken as example.

Figure 4:
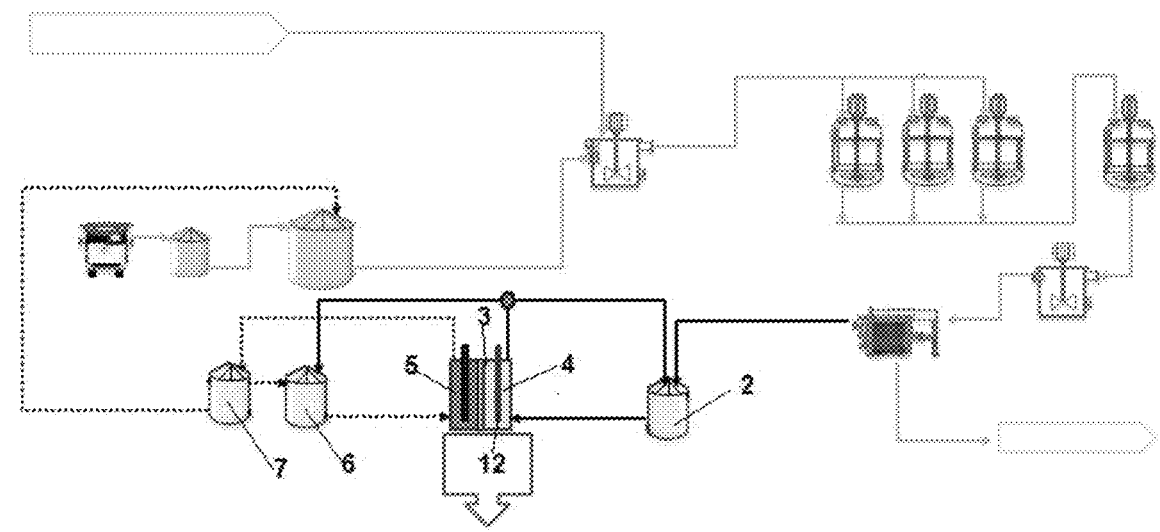
FIG. 4 shows a diagram of the system applied to the treatment of scrap metal or metals.

FIG. 4 shows a diagram of the system applied to the treatment of scrap metal or metals. In this case the leach fluids from scrap metal or metals are conveyed towards leaching with oxidising agents and a part of said fluids are conveyed to the cathodic feed tank (2), where the system of the invention begins to operate.

Figure 5:
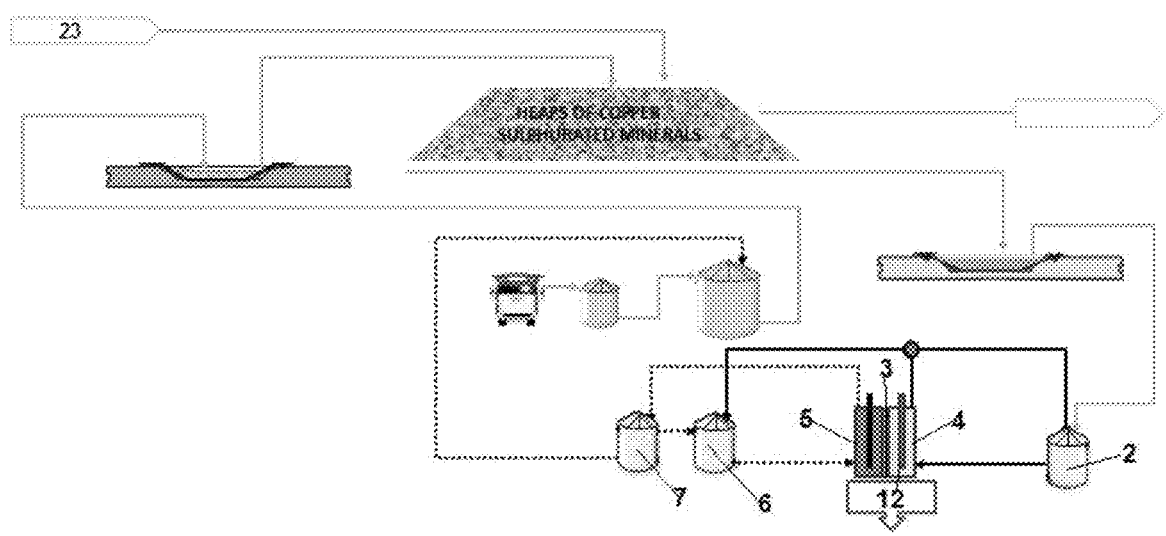
FIG. 5 shows a diagram of the system applied to the leaching of copper sulphures with ferric sulphate.

FIG. 5 shows a diagram of the system applied to copper sulphide leaching with ferric sulphate, wherein in this case copper sulphide minerals (23) release fluids which are fed to PLS tanks and this fluid is directed towards the cathodic feed tank (2) and begins the process.

Process:

The combined electrolytic process begins with the reception of the solution rich in the metal of interest from leaching that is received in the cathodic feed tank (2). This tank additionally receives a recirculation solution that allows maintaining a minimum concentration of the metal of interest in solution. This value is defined on the basis of experimentation and simulations with steady state models. The combined electrolytic process of the invention comprises the following sequential, replicable steps for one or more groups of membrane cells (3):

a) filling the cathodic solution tank (2) with a rich solution from leaching (1);
b) introducing a rich solution via flow (13) into the cathode compartment (4) producing a cathodic solution which is conveyed towards the valve (8) where a part is recirculated via flow (14) towards the tank (2) and another is conveyed via flow (15) towards the anodic solution tank (6); and
c) conveying solution from the anodic solution tank (6) via flow (18) towards anode compartment (5) and conduct the anodic solution or anolyte towards the tank (7) via flow (16) wherein a part of the solution contained in said tank (7) recirculates as a replenishment of oxidising agent into the tank (6) and another part is conveyed via flow (19) to the valve (9) where the flows (19) and (20) are conveyed towards oxidising leaching (11), wherein from said process and the system's circuit closed, the product or cathodic metal (12) is produced.

The process comprises the following steps:

a) proceeding with the initial filling of the tanks;
b) the tank (2) which feeds the cathode compartments must be filled with the rich solutions resulting from the previous solid-liquid leaching and separation process;
c) the tank feeding the anode compartments (6) must initially be filled with a prepared solution containing the ions or ionic compounds to be oxidized to send to leaching;
d) the product solution tank (7) must initially contain an aqueous solution with the leaching oxidising agent;
e) determining the electrical connections of the cells, which can be in series, in parallel or series-parallel combinations in accordance with the rectifier defined;
f) starting the drive means of the tank feeding the cathode compartments (4) and starting the drive means of the tank feeding the anode compartments (5);
g) waiting for the filling of the cathode compartments (4) and waiting for the filling of the anode compartments (5);
h) starting the drive means for distributing the solution containing the oxidising agent towards leaching;
i) activating feeding of rich solution from leaching which supplies the cathode compartments' feed tank (2);
j) receiving the discharged solutions from the cathode compartments (4) in one or more pipes which convey these discharged solutions to the feed tank (6) of anode compartments (5);
k) distributing all or a fraction of the discharge solutions from the anode compartments (4) to the product solution tank (7);
l) the remaining solution fraction from the cathode compartments (4) is recirculated to the cathode compartments solution feed tank (2);
m) the remaining solution fraction from the anode compartments is recirculated to the anode compartments solution feed tank (6);
n) energizing the electrical system which supplies the direct current required by the electrolytic cells;
o) controlling that the process reaches steady state; and
p) operating the system in steady state.

Special Considerations:

The discharged solution from the tank (2) can supply electrolyte in series or in parallel to one or more groups of cells (only one group appears in the figures), as defined by the required hydraulic study. Likewise, in a group of membrane cell devices (3), electrolyte can be supplied in series or in parallel to each cell according to hydraulic calculations defining it. The electrolyte fed from the tank (2) must supply each cathode compartment (4) with the same flow rate and at the same concentration, equal to that contained in the discharged flow of the tank (6). Therefore, the hydraulic design must consider this premise when defining the circuit of catholyte solutions.

The discharged solutions from the cathode compartment (4), from each cell (3), are collected in a flow line constituting the catholytic discharge electrolyte. A fraction of the discharge flow is recirculated to the tank (6), which as mentioned above must be determined experimentally and based on steady state models. The remaining fraction of catholyte is sent to the tank (7) of oxidising agents. The tank (7) additionally receives a recirculation flow corresponding to the anolyte discharge solution coming from the respective compartment of the electrolytic cells (C2). Similarly as regarding to the catholyte, the discharged solution of the tank (7) must supply with the same flow rate each anolyte compartment (5) of the cells (3). The fraction which recirculates must be determined experimentally and using steady-state models. The discharge of anolyte from the cells is divided into two fractions, one that recirculates to the tank (6) and another one that constitutes the leaching solution that returns to leaching, being previously stored in the tank (7). The tank (7) stores the reagent make up allows to maintain the reagent level in the system, and which only corresponds to the reagent that is lost in the washing stage of the previous filtration or which precipitates in some compound in the leaching process.

Electrical connections: cells (3) require direct current supplied by a transformer/rectifier system which provides the necessary amperage for a given production of the metal of interest. This calculation is made considering the cathodic area, the density of the current and Faraday's law. It is suggested that the connections of the electrolytic cells be carried out in series, because in this way current rectification requirements are reached, technically feasible and more economical to apply. However, it is feasible to connect the system in parallel depending on result of the most convenient calculation of the electrical system.

The cathodes produced must be carefully washed in a vessel arranged for this, avoiding traces of electrolyte remaining on the surface. The cathodes must be weighed and grouped together in batches of ten cathodes each, and sent to the cathodes field for final dispatch.

It must be considered that the anodic materials are defined for the specific chemical composition of the aqueous medium in which they will be applied, wherein such aqueous medium is determined by laboratory tests such as voltammetries and electrolytic tests performed on a laboratory membrane cell of on scale true to the industrial unit. It uses an aqueous solution from leaching that is previously treated in a solid-liquid separation process which ensures concentration of solids of less than 15 ppm. It uses an aqueous solution derived from leaching and containing some metal of interest in a hydrochloric environment or in a sulphuric environment or in a nitric environment or in an acid oxidising environment. The process can be used to precipitate metals in solution such as copper, silver, gold, cadmium, cobalt, chromium, nickel and zinc. The combined electrolytic process must operate at a current density lower than the current density's upper limit for both anodic and cathodic reactions.

The invention claimed is:

1. A combined electrolytic system for precipitating metals of interest and to regenerate oxidising agents used in the leaching of metals, scrap metals, metal sulphurs, sulphide minerals and raw materials containing metals from solutions from leaching that allows precipitation and oxidation in a single step, wherein the system comprises:
a membrane cell device comprised of a cathode compartment and an anode compartment with a respective cathode and anode, wherein the cathode compartment is separated from the anode compartment by a selective and unidirectional ion exchange membrane;
a rich solution flow line coming from said metal leaching, connected to a cathodic solution feed tank;
a rich solution entry flow line from the cathodic solution feed tank to the cathode compartment for electrolytically precipitating therein the metal of interest as cathode metal;
a cathodic solution exit flow line from the cathode compartment to a distribution valve;
a cathodic solution exit flow line from said valve to an anodic solution feed tank;
a cathodic solution recirculation flow line from said valve back to the cathodic solution feed tank;
an anodic solution entry flow line from the anodic solution feed tank to the anode compartment;
an anodic solution exit flow line from the anode compartment to a product solution tank of oxidising agents;
an oxidising agent replenishment flow line from the product solution tank of oxidising agents to the anodic solution feed tank;
an oxidising agent exit flow ne from the product solution tank of oxidising agents to a conveying valve; and
a flow line from said conveying valve to an oxidising leaching process which provides said rich solution from leaching.

2. The combined electrolytic system of claim 1, wherein the membrane cell device is made up of two or more cathode compartments and two or more anode compartment separated from each other by a selective and unidirectional ion exchange membrane.

3. The combined electrolytic system of claim 2, wherein two or more cathodic solution feed tanks are provided, two or more anodic solution feed tanks are provided and two or more product solution tanks of oxidising agents are provided together with corresponding flow lines and valves.

4. The combined electrolytic system of claim 1, wherein two or more cathodic solution feed tanks are provided, two or more anodic solution feed tanks are provided and two or more product solution tanks of oxidising agents are provided together with corresponding flow lines and valves.

5. A combined electrolytic process for precipitating metals of interest and regenerating oxidising agents used in the leaching of metals, scrap metals, sulphide metals, sulphide minerals and raw materials containing metals from solutions from leaching that allows precipitation and oxidation in a single step, wherein the process comprises the sequential steps of:
a) providing a membrane cell device comprised of a cathode compartment and an anode compartment with a respective cathode and anode, wherein the cathode compartment is separated from the anode compartment by a selective and unidirectional ion exchange membrane;
b) filling a cathodic solution feed tank with a rich solution from leaching;
c) introducing the solution in the cathodic solution feed tank into the cathode compartment to obtain a cathodic solution therein;
d) discharging cathodic solution from the cathode compartment towards a distribution valve;
e) with the valve, recirculating part of the cathodic solution discharged from the cathode compartment towards the cathodic solution feed tank and conducting another part towards an anodic solution feed tank;
f) discharging anodic solution from the anodic solution feed tank into the anode compartment;
g) discharging anodic solution from the anode compartment towards a product solution tank of oxidising agents;
h) recirculating part of the solution contained in said product solution tank of oxidising agents as a replenishment of oxidising agent into the anodic solution feed tank;
i) conveying another part of the solution contained in said product solution tank of oxidising agents towards a conveying valve;
j) conveying a replenishment of oxidising agent solution towards said conveying valve; and
k) conveying both solutions from steps f) and g) towards an oxidising leaching process;
wherein the metal of interest is electrolytically precipitated as cathode metal in the membrane cell device and said rich solution from leaching is produced in said oxidising leaching process.

6. The combined electrolytic process of claim 5, wherein the sequential steps are replicable for one or more groups of membrane cell devices.

* * * * *